(12) United States Patent
Kozich

(10) Patent No.: US 11,814,992 B2
(45) Date of Patent: Nov. 14, 2023

(54) SYSTEM AND METHOD FOR HEATING STEAM AND CHEMICAL FEED LINES FOR NATURAL GAS POWERED PLANTS

(71) Applicant: Indeeco, LLC, St. Louis, MO (US)

(72) Inventor: John Kozich, Cypress, TX (US)

(73) Assignee: Indeeco, LLC, St. Louis, MO (US)

( * ) Notice: Subject to any disclaimer, the term of this patent is extended or adjusted under 35 U.S.C. 154(b) by 127 days.

(21) Appl. No.: 17/471,436

(22) Filed: Sep. 10, 2021

(65) Prior Publication Data

US 2022/0082033 A1    Mar. 17, 2022

Related U.S. Application Data

(60) Provisional application No. 63/077,007, filed on Sep. 11, 2020.

(51) Int. Cl.
| | |
|---|---|
| *F01K 23/10* | (2006.01) |
| *H05B 1/02* | (2006.01) |
| *F16L 53/38* | (2018.01) |
| *F16L 25/02* | (2006.01) |
| *F16L 59/153* | (2006.01) |
| *H02G 3/08* | (2006.01) |

(52) U.S. Cl.
CPC .............. *F01K 23/10* (2013.01); *F16L 25/02* (2013.01); *F16L 53/38* (2018.01); *H05B 1/0244* (2013.01); *F16L 59/153* (2013.01); *H02G 3/08* (2013.01); *H05B 2203/016* (2013.01); *H05B 2203/035* (2013.01)

(58) Field of Classification Search
CPC ........ F01K 23/10; F01K 23/106; F16L 25/02; F16L 53/38; F16L 59/153; F16L 25/026; F16L 59/143; F16L 53/37; H05B 1/0244; H05B 2203/016; H05B 2203/035; H05B 3/0004; H05B 1/0247; H05B 2203/022; H05B 2214/02; H02G 3/08; Y02E 20/16
USPC ..................................... 60/39.182, 646, 657
See application file for complete search history.

(56) References Cited

U.S. PATENT DOCUMENTS

| | | | | |
|---|---|---|---|---|
| 4,683,361 | A | * | 7/1987 | Driggers ................ B23K 3/053 219/85.1 |
| 5,111,662 | A | * | 5/1992 | Nicolin .................... G21D 5/16 60/39.182 |
| 2014/0352304 | A1 | * | 12/2014 | Arias ...................... F22B 1/006 60/645 |
| 2020/0084839 | A1 | * | 3/2020 | Kozich .................... H05B 3/40 |

* cited by examiner

*Primary Examiner* — Hoang M Nguyen
(74) *Attorney, Agent, or Firm* — Husch Blackwell LLP

(57) ABSTRACT

A system and method for heating steam sample and chemical sample and feed tubes/lines in a natural gas fired heat recovery steam generator (HRSG) power plant including a tube impedance heater (IH) control system and at least one impedance heated tube having an outer insulation and an electrically conducting inner tube member, the impedance heated tube having an input IH feed power electrical connector and electrically connected at a first connection to the inner tube member, and a return IH power electrical connector electrically connected at a second connection by a first end of a return electrical cable and a first connector and second connector each mechanically and fluidly coupling the first and second connections respectively to the inner tube member to the steam sample or chemical sample or feed tube/line and electrically isolating the first end and second ends.

22 Claims, 5 Drawing Sheets

US 11,814,992 B2

SYSTEM AND METHOD FOR HEATING STEAM AND CHEMICAL FEED LINES FOR NATURAL GAS POWERED PLANTS

CROSS-REFERENCE TO RELATED APPLICATIONS

This application claims the benefit of U.S. Provisional Patent Application Ser. No. 63/077,007, filed Sep. 11, 2020, which is hereby incorporated herein by reference.

STATEMENT REGARDING FEDERALLY SPONSORED RESEARCH OR DEVELOPMENT

Not Applicable.

FIELD

The present disclosure relates to natural gas combined cycle power plants, and more specifically, to methods and systems of operating a heat recovery steam generator's steam and chemical feed tubes/pipes thereof.

BACKGROUND

The statements in this section merely provide background information related to the present disclosure and may not constitute prior art.

Natural gas fired combined cycle power plants incorporate the use of steam drums located in the heat recovery steam generators (HRSG). The HRSG includes a set of steam drum, often found on a steam drum platform on which steam drums are placed or positioned. These often include high pressure (HP), intermediate pressure (IP) and low pressure (LP) steam drums SD, referred herein as $SD_{HP}$, $SD_{IP}$ and $SD_{LP}$, respectively. In operation, the steam drums receive water or water and steam, either directly or indirectly, and provide the held water and steam to an evaporator EV that receives heat from a gas-fired turbine for an initial conversion of the held water into steam, which is returned to the respective steam drum SD. The SD then provides the held steam S to a superheater SH that receives heat from the gas turbine that super heats the steam S from the steam drum that is then provided as superheated steam SPS to steam turbine ST connected to an electric generator G. The superheated supply steam SPS from each steam drum is provided to a different ST such as the $SPS_{HP}$ is provided to a $ST_{HP}$, and likewise for the IP and LP.

To monitor the HRSG system and to ensure proper operation thereof, sample and steam flow lines (or pipes or tubes and referred herein as feed tubes FP) are connected to the input and output lines between each evaporators EV and superheaters SH and their respective steam drums or turbines for providing fluid connection thereto. The steam monitoring feed tubes FPs are routed to a steam analyzer system AS for monitoring the steam in each line. Similarly, chemical analysis and feed tubes FP provide samples of steam to chemical analysis systems to monitor and maintain water/steam quality, and chemical injection tubes that are coupled to chemical feed systems can provide a fluid path to these FPs for injecting or providing chemicals as deemed appropriate by the HRSG system. As these HRSG systems are large and operate in the environment and are not enclosed, the HRSG system sample and feed tubes FPs are typically heated to protect them from freezing as these are typically located outside in harsh cold weather environmental operating conditions. A typical HRSG system has nine (9) type FP runs, though fewer or more are possible.

An example of an HRSG 10 power plant is shown in FIG. 1 which is a functional block diagram which is not intended to show physical layout or structure but only the functional elements and components associated with the HRSG system's sample and feed tubes and their relationship and connectivity to other HRSG system components. As shown, the HRSG 10 system has a gas supply GS 12 that provide gas to gas turbine GT 14 to generate heat 16. The generated heat H passes through high pressure evaporator $EV_{HP}$ 18 then to the high pressure superheater $SH_{HP}$ 20, with each being connected to the $SD_{HP}$ 22 by steam lines that are denoted by darker lines having a thicker line width in FIG. 1. There are input steam lines $SLHP_i$ 24 that provides water and steam from the $SD_{HP}$ 22 to the $EV_{HP}$ 18 and similarly to the $SH_{HP}$ 20. The $EV_{HP}$ 18 has an output steam line $SL_{HPO}$ 26 that is coupled back to the $SD_{HP}$ 22 to provide the initially transitioned steam to the $SD_{HP}$. The $SH_{HP}$ 20 has an output turbine supply steam line $SPShp_O$ 28 that provides the superheated high pressure supply steam to the high pressure steam turbine $ST_{HP}$ 32 of the team turbine ST30. This same arrangement applies for the intermediate pressure steam drum $SD_{IP}$ 34 with input steam lines $SL_{ipi}$ 36 from the $SD_{IP}$ 34 to each of the $EV_{IP}$ 38 and the $SH_{IP}$ 40. The outtake steam line $SLip_O$ 42 from the $EV_{IP}$ 38 connected back to the $SD_{IP}$ 34 and the superheater intermediate pressure $SH_{IP}$ 40 has an superheated intermediate pressure supply steam output line $SPSip_O$ 44 that provides intermediate pressure supply steam to the intermediate pressure steam turbine $ST_{IP}$ 46. Similarly, for the low pressure steam drum $SD_{LP}$ 48 with input steam lines $SLlp_i$ 50 from the $SD_{LP}$ 48 to each of the $EV_{LP}$ 52 and the $SH_{LP}$ 54. The outtake steam line $SLlp_O$ 56 from the $EV_{LP}$ 52 connected back to the $SD_{LP}$ 48 and the superheater low pressure $SH_{LP}$ 54 has superheated low pressure supply steam line $SHSlp_O$ 58 that provides low pressure supply steam to the low pressure steam turbine $ST_{LP}$ 60.

As noted above, each of the input steam lines 24, 36, 50 from the steam drums SD 22, 34, 48 to their respective evaporator EV 18, 38, 52 and superheater SH 20, 40, 54, and the output line 26, 42, 56 from the evaporator EV 18, 38, 52 back to the SD 22,34, 48, and from the superheater SH 20, 40, 54 output as supply steam to the respective pressure turbine ST32, 46, 60, includes a port or connection for providing a portion of the steam in each steam line 24, 26, 28, 36, 42, 44, 50, 56, 58 to a steam monitoring system and/or a chemical monitoring and supply system (collectively referred herein as a analyzer/chemical system or AS/CS) 62 via a feed tube FP 64, 66, 68, 70, 72, 74, 76, 78, 80, 82, 84, 86. Each feed tube FP provides a fluid connectivity between a respective steam line SL 24, 26, 24, 28, 36, 42, 36, 44,50, 56, ? 58 and a connection in the AS/CS system, 62 which monitors and maintains the water/steam quality based on the samples received from the FPs. As shown in FIG. 1, each feed tube FP 64, 66, 68, 70, 72, 74, 76, 78, 80, 82, 84, 86 is denoted as being related to the respective steam line SL 24, 26, 24, 28, 36, 42, 36, 44, 50, 56, 50, 58 from which it connects and provides fluid connectivity between the SL and the AS/CS 62. Each of these are shown in FIG. 1 by lines having a thinner width in FIG. 1 than the streamlines. As the AS/CS 62 are located remotely as often being in a environmentally controlled building or assembly, and the HRSG 10 and the SLs are located outdoors in an uncontrolled environment, therefore the FLs are often quite long and also located in uncontrolled environments and therefore require heating for properly providing an accurate sample of the steam to the AS/CS 62 and also for providing the steam and chemicals that are at temperature that are sufficiently high in order for proper monitoring and operations of the HRSG 10 and its required AS/CS62 control systems.

Existing systems for heating these sample and feed tubes FPs include pre-traced tube bundles of one or more feed tubes that incorporate self-regulating electric heat tracing. Each sample and chemical feed tube within the pre-traced tube bundles has a separate or individual heater circuit per tube run, and often, requires two heater circuits per pipe/tube run. As such, for a typical HRSG system, there can be 10 or more heater circuits per HRSG, each of which must be powered and controlled. The higher temperature lines on the IP drums $SD_{IP}$ 34 and HP drums $SD_{HP}$ 22 require buffered electric heat tracers. Further a heat trace electrical breaker is installed to supply power to each the electric heat tracers. The power feeds to each heat tracer are field routed to connect the heat tracers to the power supply as provided by a heat trace electrical breaker. FIG. 1 illustrated that a combined unit 88 with a control panel CP and transformer T receives input from one or more sensors S that are monitoring operations of the HRSG 10. The control panel CP provides control input or control signal CS to a transformer T that has a power feed input $P_{Fi}$ 90, that is provided to each of the trace heater circuits as at each first end of each respective pre-traced tube bundles for powering of the heat trace heaters thereof. These $P_{Fi}$ inputs 90 are typically provided at or in close proximity to the connection of each FP to its SL. The other end of the power feed line circuit is the $P_{Fo}$ 92 which is the output of the power feed at a second end of each feed tune line that is electrically coupled back to the power cabinet with the transformer T as $P_{Fo}$ 92. Each of these return heat trace power lines $P_{Fo}$ complete the circuit with each corresponding $P_{Fi}$ 90. Further, typically the end of the $P_{Fo}$ and the return junction box is located at or in proximity to the AS/CS system 62.

In other prior art systems, heat traced piping are provided with the field installed heat tracing and insulation being installed on each pipe. In a single HRSG, there is often a mix of self regulating and mineral insulated heat tracing of the sample and feed tubes. In this design as well, each sample line and chemical feed line has at least one if not two individual heater circuits. The higher temperature lines on the IP drums and HP drums require mineral insulated tracers. A heat trace electrical breaker is supplied to power the electric heat tracers and the power feeds are also field routed to connect the heat tracers.

The design, operation and maintenance of these existing heat tracing systems for these steam and chemical pipes can be complex and costly to install and to maintain. These current systems can have high costs for engineering design, high labor and equipment costs for installation, as they are often complex and time consuming. Additionally, due to the individual circuit requirements, they have high operating costs with an electrical circuit for each heat trace heated line. The retrofitting of existing systems is also difficult and expensive as the installed systems typically require the replacement of the entire installed insulated pipes or tube bundles and heating system electrical components. For each installation in an HRSG, there is often 12-20 heater circuits required. These heat trace circuits require a heat traced power panel, power feeds, cable tray, and cable connection kits, and in a retrofit or maintenance replacement, many if not all of these must be replaced.

These systems are also operationally expensive as during operation, the heat trace heated pipes and the pipe unions are prone to have leaks and require constant maintenance. Further, they are prone to have breaks in their insulation for additional circuit connections and have moisture ingress at failure locations which cause breakdowns in the insulation. These all require high system maintenance of cable, insulation, connection kits, and power supply components, and therefore high operational and maintenance costs. Further, these buffered bundle designed systems have high wattage or power requirements and therefore are expensive to power. These systems also must use mineral insulated (MI) cable which is expensive and must be manufactured off-site as they cannot be cut to length or for use with the heat tracing in the field.

Therefore, there is a need for a system and method of heating these chemical and steam flow tubes in an HRSG system that has reduced complexity, reduced components, reduced operational costs, and therefore overall lower costs. There is also a need to improve through an upgrade existing HRSG sample and feed tube heating systems that is less costly to upgrade, reuses existing tubing, provides for heating of the tubes at lower operational costs including lower electrical power costs and lower operational and maintenance costs.

SUMMARY

The inventor hereof has succeeded at designing an improved sample and chemical tube heating system and method for use in an HRSG system that offers simplicity, reduces the number of components, and reduces maintenance and operational costs. Further, as described herein, the presently disclosed system and method can be used not only for new tube heating systems and installations, but can also be used for retro-fitting of existing heat trace heated tube with new and improved lower cost impedance heating (IH) systems. As described herein, the method and system for retrofitting existing sample and chemical feed tubes includes using the existing previously installed heat trace tube, regardless of the prior heating technology. Where a line is currently heated with a heat trace, the existing heat trace heater cable is disconnected and left intact in place and no longer used. These existing tubes are retrofitted with new tube impedance heating systems. The prior transformer and power distribution system is replaced with a more cost effective solution for heating the tubes. As described herein, such a retrofit is an improvement over other forms of retrofitting existing heat trace tubes as the tubes and their insulation are reused in place and do not have to be removed or replaced.

According to one aspect, a system for heating steam sample and chemical sample and feed tubes/lines in a natural gas fired heat recovery steam generator (HRSG) power plant having a plurality of steam drums (SD). The system has a tube impedance heater OPTIONAL (IH) control system for the method of controlling an electrical power for an impedance heated tube through a transformer that receives input power and generates output IH feed power, and a feed electrical junction box that is coupled to a power feed of the transformer having input IH feed power from the transformer and a return electrical junction box coupled to the a power return of the transformer having return IH power to the transformer, The system further includes heating of an impedance heated tube, or plurality thereof, each having an outer insulation and an electrically conducting inner tube member providing a heating of the steam sample or chemical. The impedance heated tube has an input IH feed power electrical connector and is electrically connected at a first connection to the inner tube member of the impedance heated tube by a first end of an input feed electrical cable that has a second end connected to the feed electrical junction box. A return IH power electrical connector is electrically connected at a second connection to the inner tube member by a first end of a return electrical cable and has a second end connected to the return electrical junction box. The system includes a first connector mechanically and fluidly coupling the first connection to the inner tube member to the steam sample or chemical sample or feed tube/line and electrically isolating a first end of the inner tube member therefrom. Further the system includes a second connector mechanically and fluidly coupling the second connection of the inner tube member to the remote steam sample or chemical sample and feed system and electrically isolating a second end of the inner tube member therefrom.

According to another aspect, a method of operating steam sample and chemical sample and feed lines in a natural gas fired heat recovery steam generator (HRSG) power plant having a plurality of steam drums (SD). The method includes electrical power for an impedance heated tube by a tube impedance heater IH system, receiving input power at a transformer and generating output IH feed power in response to an instruction received from the tube impedance heater IH system, feeding power from the transformer to a feed electrical junction box, and receiving return electrical power at a return junction box coupled to the power return of the transformer. The method also provides for the heating of an impedance heated tube having an outer insulation and an electrically conducting inner tube member as the steam sample or chemical sample or feed from between the input from a steam drum to an evaporator or superheater or an output from an evaporator to the steam drum or an output of a superheater to a steam turbine. The impedance heated tube having an input IH feed power electrical connector and electrically connected at a first connection to the inner tube member of the impedance heated tube by a first end of an input feed electrical cable having a second end connected to the feed electrical junction box, and a return IH power electrical connector electrically connected at a second connection to the inner tube member by a first end of a return electrical cable having a second end connected to the return electrical junction box. The method also includes mechanically and fluidly coupling a first connector at the first connection to the inner tube member to the steam sample or chemical sample or feed tube/line and electrically isolating a first end of the inner tube member therefrom; and further includes mechanically and fluidly coupling a second connector at the second connection of the inner tube member to the remote steam sample or chemical sample and feed system and electrically isolating a second end of the inner tube member therefrom.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Presently disclosed is a novel application of an impedance heating method and system for sample test and chemical feed lines (referred herein as "tubes") that offers simplicity and reduced components for the heating of steam sample and chemical feed tubes for natural gas HRSG power plants. It should noted however that the disclosed system and method could be used for different types of powered power plants other than gas fired plants and other than HRSG power plants and still be within the scope of the present disclosure in some embodiments.

Figure 1:
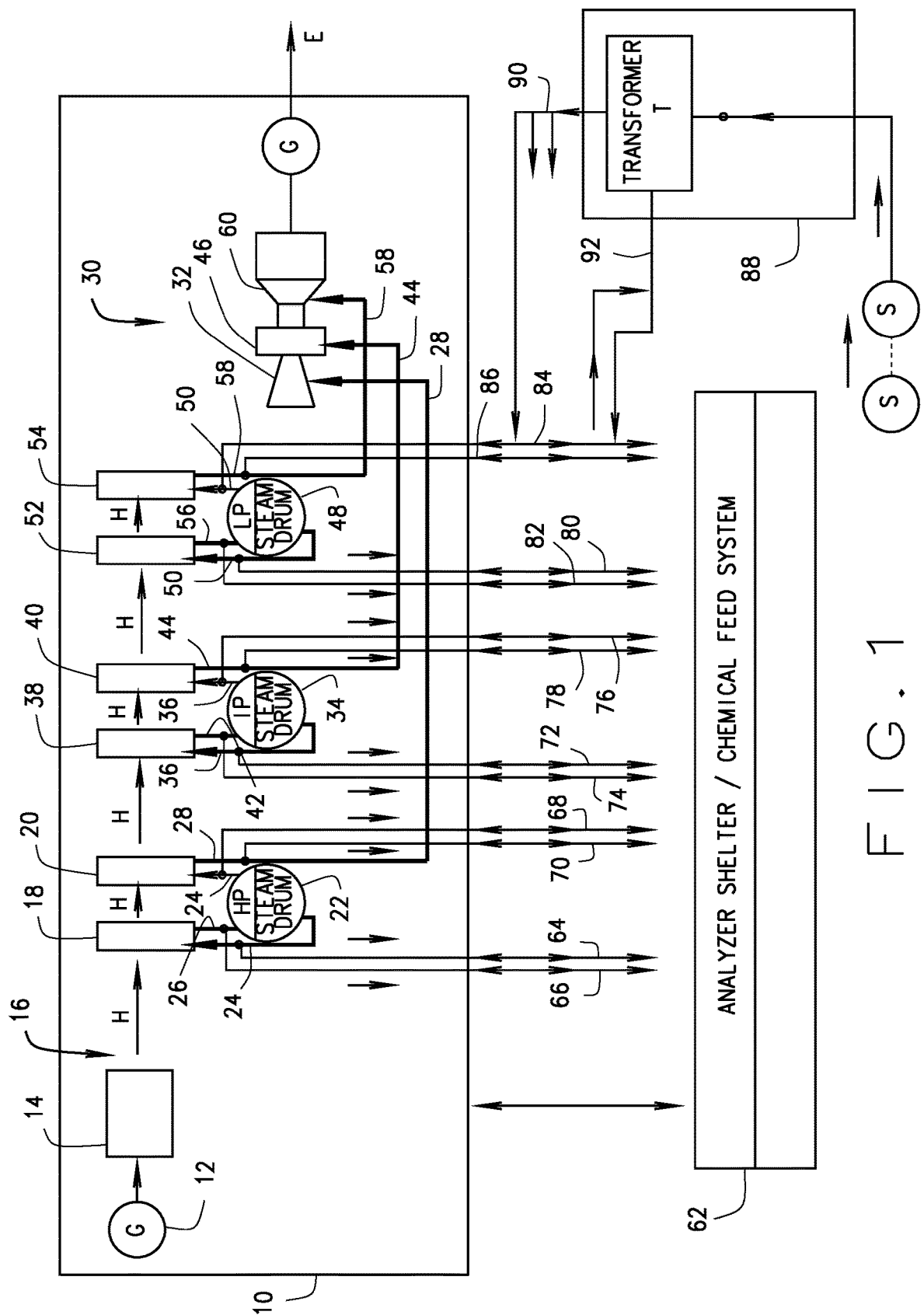
FIG. 1 is a block diagram of a natural gas fired heat recovery steam generator (HRSG) power plant including steam sample and chemical sample feed tubes/pipes according to the prior art.

Referring back to FIG. 1, as noted above in the background, existing systems and methods for heating of the feed tube FP 64, 66, 68, 70, 72, 74, 76, 78, 80, 82 include filed installed heat tracing and insulation that is installed on each tube, which often includes mineral insulated MI piping or mineral insulated heat tracers, that receive an input heat trace power on a first end of the FP that is fed by a circuit breaker and feeder junction box. For each heat trace circuit, a return heat trace power line at the second end at or near or in proximity to the AS/CS systems 62 which are provided to a return junction box for completing each of the heat tracer circuits. The heat trace heaters for each FP typically use mineral insulated cable that is pre-cut and delivered and then installed with the heat trace power cables being installed at that time.

The presently disclosed system and method provides for replacement, retrofit or alternative new installation system that does not utilize or require the use of FP heat tracer for heating of each FP. Rather than heat tracer or heat trace bundles that have heat trace installed within MI cable, each FP is heated using an impedance heating IH system and method which provides for the required heating of the FP but with simpler IH system having fewer system components. For example, there is no need for a heater cable; no need for a heat tracer connection kit or assembly, there is less power cable, fewer heater circuits, and therefore reduced power cabling supports such as cable trays. For retrofitting an existing self-regulating or MI heat traced system, the prior existing feed tube is maintained and is not removed or replaced, but is rather only modified to being an IH system as described herein.

In some embodiments, a method of retrofitting existing sample and chemical feed tubes that have previously installed heat trace tubes or pipes, the existing heat trace heater cable to the heat traced tube is disconnected and left intact in place and no longer used. These existing pipes are retrofitted with a new tube impedance heating system. This process includes replacement of the tube fittings with newly designed electrically isolating fittings that can include IH electrical lug connectors on the tube side for IH heating of the tube or pipe, with the newly installed fitting isolating the IH electrical power to the inner tube. To accomplish this, the existing insulation at the ends of the tubes or heat trace bundle tubes is temporarily removed or partially removed which also provides for the disconnection of the heat trace power leads. For example, where MI or other insulation is present at the end or at a center feed location for the IH heating system, newly installed electrically isolated fittings are installed and new electrical leads as described herein installed to the IH powering system. These new IH heating connections can be connected to the inner pipe or tube by welding or a strap or clamp or by the new fitting itself. New IH electrical system is installed as the prior heat traced transformer and power distribution system is replaced with a more cost effective arrangement of IH powering systems that are configured for the IH powering and with new electrical powering cables or lines to new junction boxes and a newly customized transformer and control system. The disconnected heat trace cables are typically retained in place but not used, and the insulation can be retained or reinstalled over the IH powering system and leads and sealed as required. In some installations or situations though, one or more of the heat traced lines may be determined to be no longer usable for various reasons. In such cases, one or more of the heat traced tubes or bundles can be bypassed with the new IH tubes that can be cut to length at the job site and the old abandoned heat traced tubes either removed, or can be cut back and retained in place as supporting structure.

Such an embodiment for a retrofit is a major improvement over other forms of retrofitting existing heat trace pipes as the tubes and their insulation are reused in place and do not have to be removed or replaced.

The present system also provides for the use of an improved feed tube and heating system and arrangement that utilizes pre-insulated feed tubes for providing the steam samples and chemical feeds between the steam lines $SL_i$, $SL_O$ and SPS lines of an HRSG or other applicable power plant system. The improved impedance heated feed tubes $FP_{IH}$ are impedance heated IH inner tubes that are pre-insulated to form the $FP_{IH}$, having a center feed tube for providing the water/steam and/chemicals as described above. The $FP_{IH}$ replace the above described heat traced bundles with a center tube that is itself heated through impedance heating having a FP power input at one location along the $FP_{IH}$, and an FP power output or return at another location along the $FP_{IH}$.

As the FT member is a conductor, each of the first and second ends of the $FP_{IH}$ is configured with a newly designed insulated fitting provides for isolating of the electrical connectivity of the inner FT from the coupled respective steam line $SL_i$, $SL_O$ and SPS, and also at the second end of each feed tube $FP_{IH}$ where the FP connects to the AS/CS system or one or more of its components. The improved isolating fitting is installed at each end of the FP so that the inner FP is electrically isolated from the components to which they are attached. Further, in some embodiments, the isolating fitting can also include an integrated or attachable power lug or connector for connecting an electrical connection of the power input for the IH system referred here to as the PIHi at the first end and the output return power $PI_{Ho}$ at the second end. In other embodiments, the insulating fitting does not include a power lug but rather the input power $PI_{Hi}$ and output return power $PI_{Ho}$ are electrically coupled to the inner FT by a suitable means which can include a direct connection such as welding, soldering, or welding of a cable connector to the outer surface of the FP, or coupling with an electrical power saddle or strap conductor arrangement. In some embodiments, such as longer length feed tubes FP, the input power $PI_{Hi}$ can be provided at or near the center of the FP or at least an intermediate position between the first and second ends by similar means of attachment as described above. In such embodiments, where the insulating fitting is available, an arrangement of two back to back insulating fittings with power lugs can be used, for providing a center input power in a back to back arrangement, with the first and second ends each being configured for having an output return power $PI_{HO}$ provided from the lug of an insulating fitting with power lugs. In some embodiments, the center located power feed can be provided through any suitable electrical attachment means as described above, or by a coupling having a power lug as described above.

As compared to the prior art systems addressed above, the present system has a single transformer and control panel that provides for the powering of all of the $FP_{IH}$ at a HRSG. The single transformer is sized for each particular installation's powering requirements, but no duplication of transformers is required as with the existing heat traced heated cable bundles. Additional transformers can be added as needed by the installation configuration. In some embodiments, a single input power feed cable $PF_i$ provides all of the input power required for all $FP_{IH}$ cables from the transformer to a input power feed junction box, which in many embodiments is located at or near the first end of each of the FPs, which is typically at or near the steam drums SDs. Of course, two or more $FP_i$ cables can be provided in some installations as may be required or desired. The newly designed IH system junction boxes provided for the electrical power cable terminals and used to distribute IH electrical power using a larger power cable providing to multiple individual smaller IH tube feeder cables both on the input feed and on the return side of the IH powering loop. An input power feed junction box then provides input power to each of the $FP_{IH}$ power feed inputs, whether located at the first end or whether located as a "center" or non-end feed $FP_{IH}$. Each of the return power lines $PI_{Ho}$ are connected from the IHP return power connection to a return power junction box, which is then connected back to the single transformer.

The IH system can utilize one or more forms of control of the IH electrical energy and therefore the heating of the IH tubes. These can include uncontrolled, line sensing thermostats, and electronic controls having temperature sensor providing sensed temperature input to the control system.

In some embodiments, as noted, one or more $FP_{IH}$ temperature sensors can be provided for monitoring the temperature of one or more portions of one or more of the $FP_{IH}$ lines. Such $FP_{IH}$ temperature sensors are configured to provide their sensed temperature SD to the control panel that in turn controls the power as provided by the feed junction box to each associated $FP_{IH}$ power feed input. In some embodiments, one or more $FP_{IH}$ lines can have individual line thermostats installed for aiding in the control of the heating of the $FP_{IH}$ by providing a thermostat control from the line thermostat back to the power feed junction box and the power feed circuit for that $FP_{IH}$ cable.

The system as described herein can be for an initial installation of a new HRSG or can be for retrofitting an existing HRSG to reduce operating and maintenance costs. Where retrofitting an existing HRSG that has one of the above described trace heated feed tube $FP_{IH}$ arrangements, the retrofit can be provided as an upgrade kit that does not require the traditional significant amount of customized installation. Such a retrofit kit can include one or more IH transformers wherein if one is sized for the requirements of the particular HRSG. Additionally, the kit can include an amount of continuous IH tubes such as in a coil that can be cut to customized sizes at the job site, or can include precut lengths and customizable lengths of pre-insulated $FP_{IH}$ piping that can be adapted at the installation site to the appropriate lengths as required for each FP.

Figure 2:
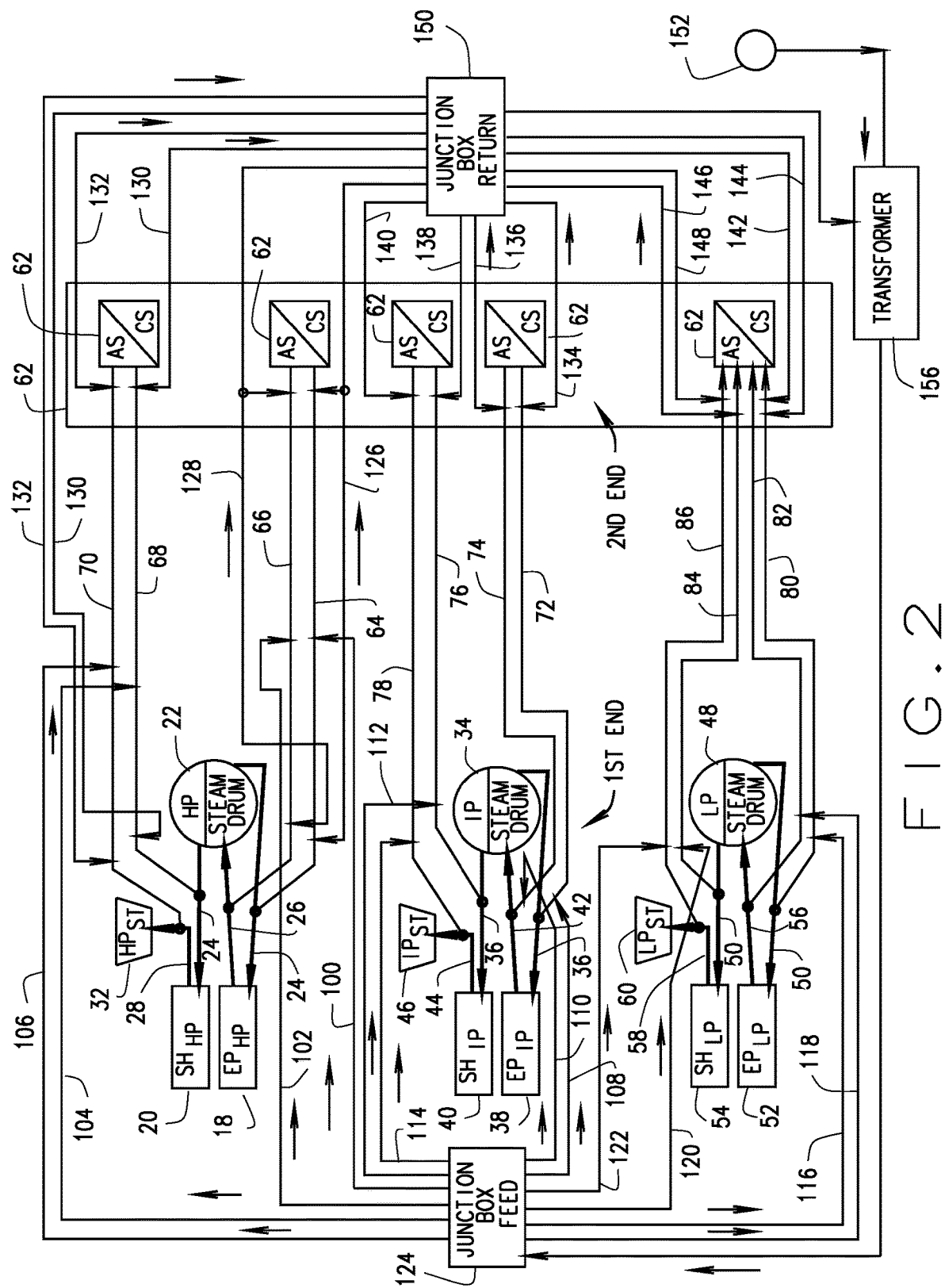
FIG. 2 is a block diagram of a HRSG plant having impedance heated steam sample and chemical sample feed tubes/pipes according to some exemplary embodiments of the present disclosure.

Further the kit can include a plurality of the improved insulated and electrical isolating fittings with or without the electrical power lugs as well as power cable and where required electrical connectors. The kit can also include one or more temperature sensors and sensor wiring, and one or more line thermostats. Typically, the kit will also include electrical enclosures that provides for the splitting of the power feed power and the power returns for all of the $FP_{IH}$ pipes. Referring now back to the Figures, FIG. 2 illustrates a $FP_{IH}$ installation by way of example. As stated earlier, the steam lines SL 24, 26, 28, 36, 42, 44, 50, 56, 58 are shown in darker lines having a thicker line width, and the feed tubes FP 64, 66, 68, 70, 72, 74, 76, 78, 80, 82, 84, 86 are shown by lines having a thinner line width than the steam lines and going from the respective steam lines 24, 26, 24, 28, 36, 42, 36, 44, 50, 56, 50, 58 to the AS/CS 62. The input power feed lines 100, 102, 104, 106, 108, 110, 112, 114, 116, 118, 120, 122 are shown as going from the feed junction box 124 to the power input point of the respective feed tubes 64, 66, 68, 70, 72, 74, 76, 78, 80, 82, 84, 86, and the output/return power lines 126, 128, 130, 132, 134, 136, 138, 140, 142, 144, 146, 148 are shown as going from the return power point of the respective feed tubes 64, 66, 68, 70, 72, 74, 76, 78, 80, 82, 84, 86 to the return junction box 150. Just by way of example, in this case, the high pressure feed tubes $FP_{IH}$ 64, 66, 68, 70 are shown as being powered at an intermediate point along the length of the $FP_{HP}$ feed tube by power feed lines 100, 102, 104, 106 with the return power being at each of the first and second ends by output/return lines 126, 128, 130, 132. The intermediate pressure and low pressure are shown in this example as receiving power from feed power lines 108, 110, 112, 114, 116, 118, 120, 122 at the first end near the respective steam drums SDIP 34 and SDLP 48 and the return power through the respective out/return power lines 134, 136, 138, 140, 142, 144, 146, 148 at the second end near the AS/CS 62.

Figure 3:
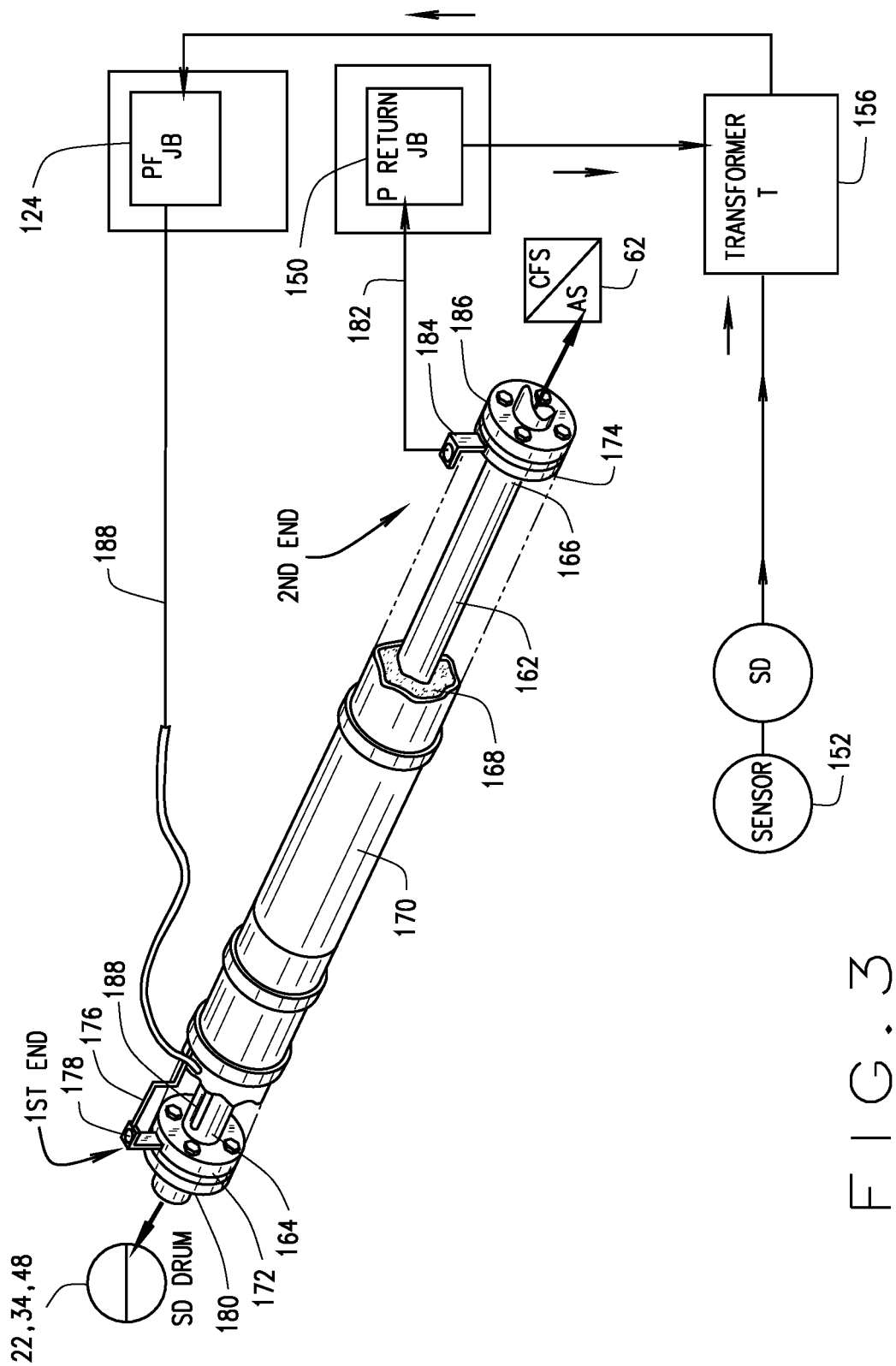
FIG. 3 is a side perspective illustration of an impedance heated feed tube and connections to the impedance heated IH systems with the power feed lines and return power lines on each end of the impedance heated feed tube according one exemplary embodiment.
Figure 4:
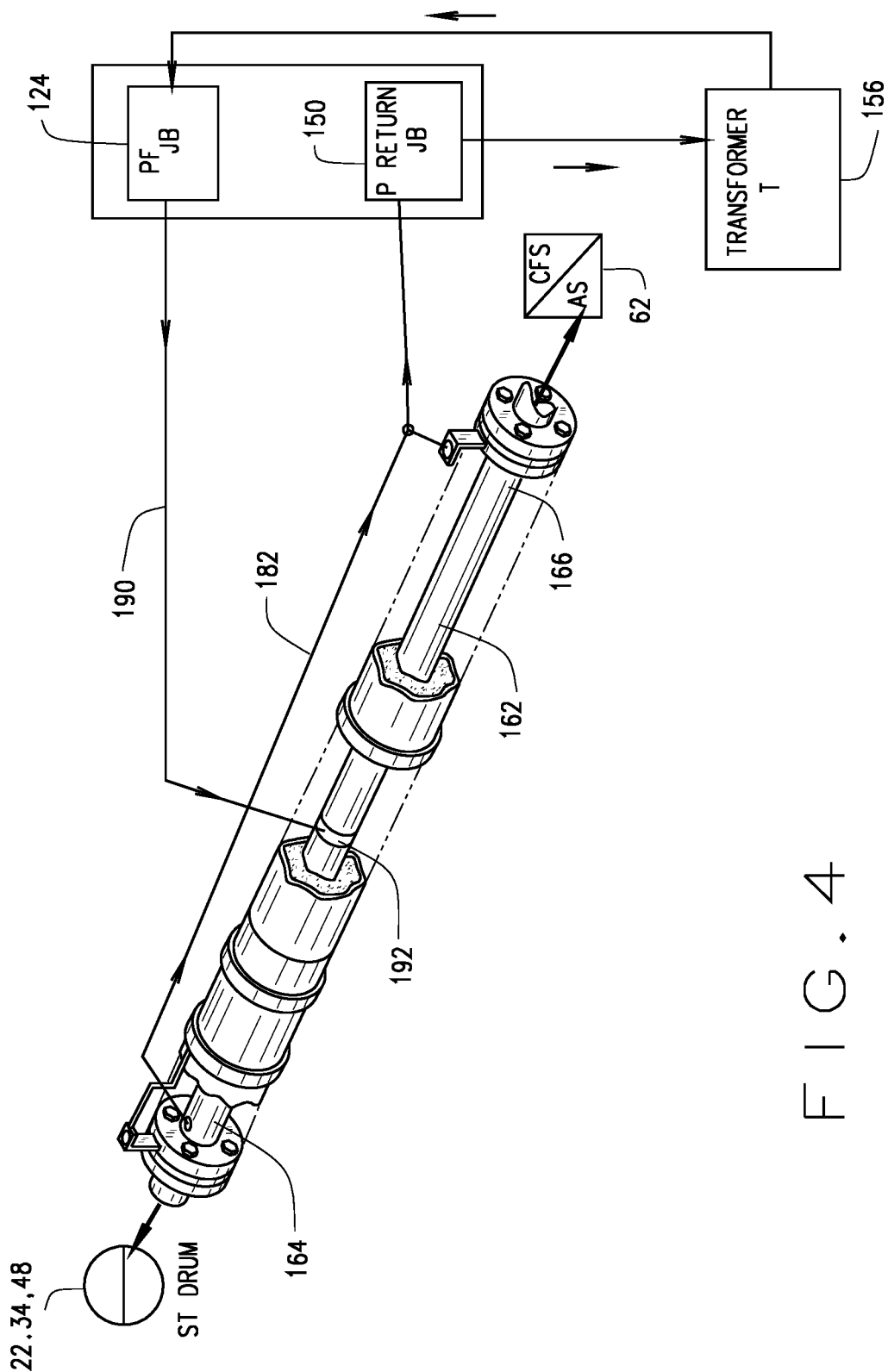
FIG. 4 is a side perspective illustration of an impedance heated tube and connections to the impedance heated IH systems with the power feed line at an intermediate position along the length of the feed tube and return power line connections on each end of the impedance heated feed tube according one exemplary embodiment.

FIGS. 3 and 4 are exemplary embodiments of a feed tube impedance heated $FP_{IH}$ arrangement with an inner FP feed tube 162 having a first end 164 and an opposite second end 166, insulation 168 and an outer member 170 which can be composed of any suitable type of material. FIG. 3 illustrates a first connector 172 on the first end 164 of the feed tube 162 and a second connector 174 on the second end 166 of the feed tube 164. An input power feed line 176 is connected to the first end 164 of the feed tube 162 by a first electrical connection lug 178 on the first end's isolation connector or flange 180, and the return power returned through an output/return power line 182 from a second electrical connection lug 184 on the second end's 166 isolation electrical connector/flange 186. Also shown by way of example, is an embodiment where the electrical connections 188 are made directly to the inner feed tube FP 162 by way of a electrical attachment thereto that is separate from the end isolating connector/flange. The input power feed line 176 and the output/return power line 182 produce an electric current through the feed tube 162 that heats the feed tube 162 by impedance heating.

FIG. 4 is similar to that shown in FIG. 3 except in this embodiment that input power $PI_{IH}$ is provided at a center or intermediate location along the length of the feed tube 162 $FP_{IH}$, which in this example the input power feed line 190 is connected to the feed tube 162 by a physical electrical attachment 192 to the inner feed tube FP 162. FIGS. 3 and 4 are only by way of example, and are not intended to be limiting as to the structure or electrical arrangements of the $FP_{IH}$ as disclosed herein.

Figure 5:
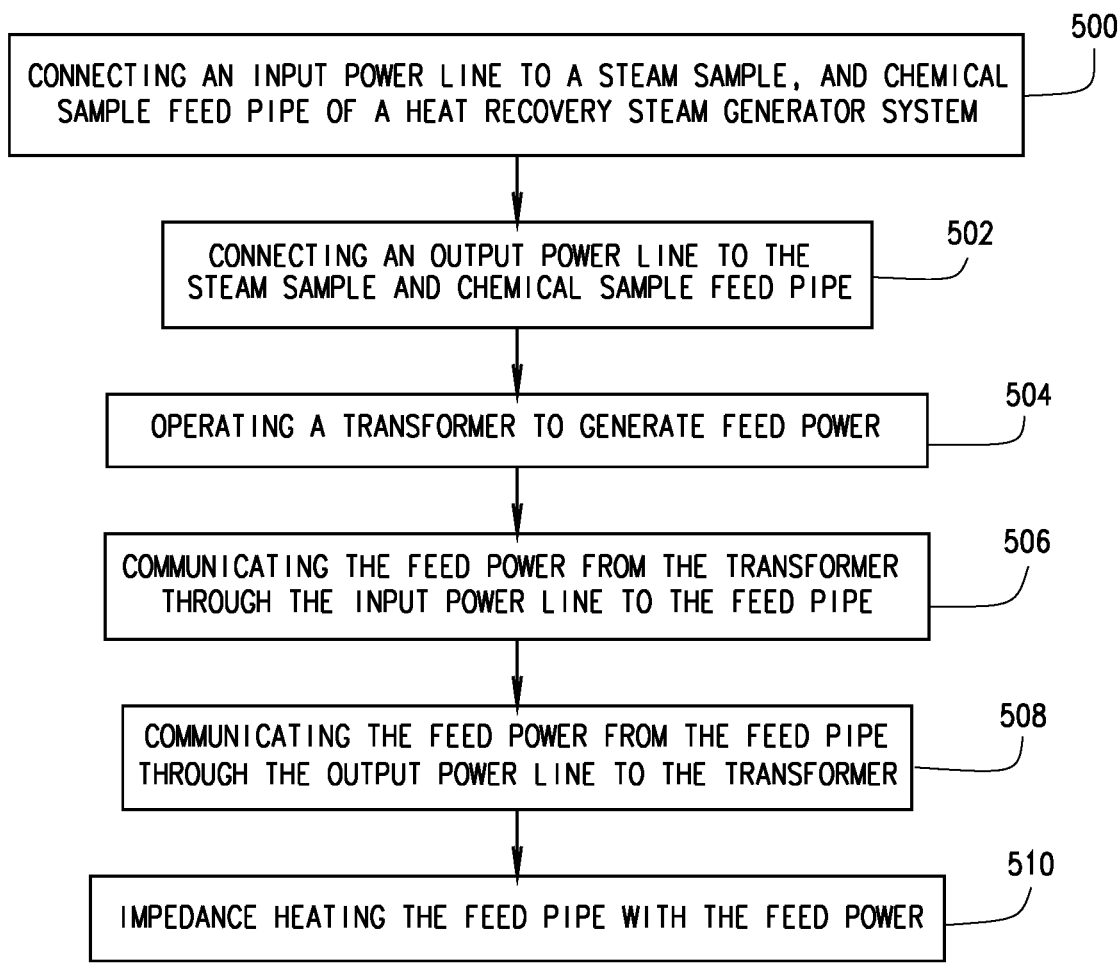
FIG. 5 is a flow chart representation of the method for heating the steam and chemical feed tubes of a natural gas power plant of FIG. 3.

FIG. 5 is a flow chart representation of one exemplary embodiment of a method for heating the steam and chemical feed tubes of a natural gas power plant such as illustrated in the exemplary embodiment of FIG. 3. As shown in this example method 500, an input power feed line 176 is connected in process 500 to a steam sample and chemical sample feed tube 162 of a heat recovery steam generator system. The input power feed line 176 is connected to a first end 164 of the feed tube 162. An output power line or output/return power line 182 is connected in process 502 to the steam sample and chemical sample feed tube 162. The output/return power line 182 is connected to a second end 166 of the feed tube 162. The transformer 156 is controlled in process 504 to generate feed power. The feed power is communicated in process 506 from the transformer 156 through the input power feed line 176 to the feed tube 162. The feed power from the feed tube 162 is communicated in process 508 through the output/return power line 182 to the transformer 156. The feed power conducted through the feed tube 162 creates impedance heating of the feed tube in process 510.

As can be seen by one of ordinary skill in the art after having reviewed the present disclosure, the present impedance heated feed tube $FP_{IH}$ and system and method as described herein has numerous benefits over the above described prior art systems. These include, but are not limited to, a far simpler feed tube arrangement and far simpler and least costly heating system and method for the feed tubes. There are fewer overall feed tube components as the heater cable is eliminated, the required heat tracer connection kits are eliminated, there is less power cable required and fewer heater circuits required at the junction boxes, reduced number of transformers, and reduced cable tray requirements for the feed tubes and the powering cables. Further, with using impedance heating, considerably less power is required, or consumed, and the operating power is less than half compared to heat traced tube bundle. Design engineering, installation labor and operational and maintenance labor are reduced significantly. The system further requires less power cable, reduced cable tray, a smaller overall installation footprint, and reduced circuit quantities with a possibility in many installations for a single circuit solution for all sample and chemical feed lines on a HRSG. As the requirements of the heat trace power lines are eliminated and the MI insulated cables are also eliminated, the present system has reduced operational maintenance, costs due to reductions in failure locations. As the $FP_{IH}$ are provided in long lengths such as on cable spools, every $FP_{IH}$ can be sized and cut using a continuous feed tube length without requiring a splice, unless a center power feed is desired. Further, unlike tracer bundles, there are no bundle splices for multiple power points and far fewer potential failure locations. For upgrades and replacements the described system and method also has considerably lower cost for retrofitting for existing FP systems in HRSG implementations.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system for heating steam sample and chemical sample and feed tubes/lines in a natural gas fired heat recovery steam generator (HRSG) power plant having a plurality of steam drums (SD), the system comprising:
    a tube impedance heater (IH) control system for supplying electrical power for an impedance heated tube;
    a transformer receiving an input power and generating an output IH feed power;
    a feed electrical junction box coupled to a power feed of the transformer having input IH feed power from the transformer;
    a return electrical junction box coupled to a power return of the transformer having return IH power to the transformer;
    the impedance heated tube having an outer insulation and an electrically conducting inner tube member providing a heating of the steam sample or chemical sample or feed tubes/lines, the impedance heated tube having an input IH feed power electrical connector and electrically connected at a first connection to the inner tube member of the impedance heated tube by a first end of an input feed electrical cable having a second end connected to the feed electrical junction box, and a return IH power electrical connector and electrically connected at a second connection to the inner tube member of the impedance heated tube by a first end of a return electrical cable having a second end connected to the return electrical junction box;
    a first connector mechanically and fluidly coupling the first connection to the inner tube member to the steam sample or chemical sample or feed tubes/lines and electrically isolating a first end of the inner tube member therefrom; and
    a second connector mechanically and fluidly coupling the second connection of the inner tube member to the steam sample or chemical sample or feed tubes/lines and electrically isolating a second end of the inner tube member therefrom.

2. The system of claim 1 wherein the first connection is at a first end of the impedance heated tube at or proximate to the first connector and the second connection is at a second end of the impedance heated tube at or proximate to the second connector.

3. The system of claim 1 wherein the impedance heated tube has a first end at the first connector and a second end at the second at the second connector, and an intermediate position located along a length of the impedance heated tube between the first end and the second end; and wherein the input IH feed power electrical connector is located at the intermediate position and there are two return IH power electrical connectors, a first return IH power electrical connector located at or proximate to the first connector and a second return IH power electrical connector located at or proximate to the second connector.

4. The system of claim 1 wherein at least one of the input IH feed power electrical connector and the return IH power electrical connector is mechanically and electrically coupled to the inner tube member by a connection to an inner tube member side of at least one of the first connector and the second connector.

5. The system of claim 1 wherein the at least one of the first connector and the second connector includes an electrical cable termination lug for mechanically and electrically coupling of the respective input feed and/or return electrical cables thereto.

6. The system of claim 1 wherein the impedance heated tube is an insulated IH tube having a length cut from a coiled length of IH tubing.

7. The system of claim 1 wherein the impedance heated tube is an insulated heat trace tube having the heat traced power leads disconnected from the heat traced electrical powering system, the insulation at least partially removed for placement of the first and second connectors to the first and second ends of the heat traced tube and for placement of the feed and return IH electrical connections to the inner tube member, having the at least partially removed insulation replaced.

8. The system of claim 7 wherein the insulated heat trace tube has a plurality of heat traced fittings, the heat traced fittings are removed and the heat traced fittings are replaced with new first and second connectors.

9. The system of claim 7 wherein at least one of the first and second electrical connectors is a welding, a soldering, a strap, or a clamp coupled to the inner tube member of the prior heat traced tube.

10. The system of claim 1, further comprising at least one line sensing thermostat positioned along the impedance heated tube and in line with at least one of the input IH feed power line and/or the return power line wherein the line sensing thermostat is configured for at least temporarily disconnecting the follow of electrical power when the thermostat senses a temperature in excess of a predetermined disconnect temperature.

11. The system of claim 1, further comprising at least one temperature sensor positioned along the impedance heated tube for sensing a temperature thereof and coupled to the impedance heater control system for transmitting the sensed temperature thereto, and the impedance heater control system being configured for receiving the transmitted sensed temperature of the sensor and configured for controlling the input IH feed power to the impedance heated tube associated with the sensor.

12. A method of operating steam sample and chemical sample and feed lines in a natural gas fired heat recovery steam generator (HRSG) power plant having a plurality of steam drums (SD), the method comprising:

controlling an electrical power for an impedance heated tube by a tube impedance heater (IH) control system;

receiving an input power at a transformer and generating an output IH feed power in response to an instruction received from the tube impedance heater control system;

feeding power from the transformer to a feed electrical junction box;

receiving return electrical power at a return junction box coupled to a power return of the transformer;

providing the impedance heated tube having an outer insulation and an electrically conducting inner tube member providing a heating of the steam sample or chemical sample or feed lines, the impedance heated tube having an input IH feed power electrical connector and electrically connected at a first connection to the inner tube member of the impedance heated tube by a first end of an input feed electrical cable having a second end connected to the feed electrical junction box, and a return IH power electrical connector and electrically connected at a second connection to the inner tube member of the impedance heated tube by a first end of a return electrical cable having a second end connected to the return electrical junction box;

mechanically and fluidly coupling a first connector at the first connection to the inner tube member to the steam sample or chemical sample or feed lines and electrically isolating a first end of the inner tube member therefrom; and mechanically and fluidly coupling a second connector at the second connection of the inner tube member to the steam sample or chemical sample or feed lines and electrically isolating a second end of the inner tube member therefrom.

13. The method of claim 12 wherein the first connection is at a first end of the impedance heated tube at or proximate to the first connector and the second connection is at a second end of the impedance heated tube at or proximate to the second connector.

14. The method of claim 12 wherein the impedance heated tube has a first end at the first connector and a second end at the second connector, and an intermediate position located along a length of the impedance heated tube between the first end and the second end; and wherein the input IH feed power electrical connector is located at the intermediate position and there are two return IH power electrical connectors, a first return IH power electrical connector located at or proximate to the first connector and a second return IH power electrical connector located at or proximate to the second connector.

15. The method of claim 12 wherein at least one of the input IH feed power electrical connector and the return IH power electrical connector is mechanically and electrically coupled to the inner tube member by a connection to an inner tube member side of at least one of the first connector and the second connector.

16. The method of claim 12 wherein the at least one of the first connector and the second connector includes mechanically and electrically coupling of the respective input feed and/or return electrical cables thereto using an electrical cable termination lug thereof.

17. The method of claim 12, further comprising cutting a predetermined length of the impedance heated tube from an insulated IH tube having a length cut from a coiled length of IH tubing.

18. The method of claim 12 wherein the impedance heated tube is an insulated heat trace tube having the heat traced power leads, the method comprising disconnecting the heat traced electrical powering system from the heat traced power leads, removing at least part of the insulation of the heat trace tube and placing of the first and second connectors to the first and second ends of the heat traced inner tube member and placing the feed and return IH electrical connections to the inner tube member, and replacing and securing the at least partially removed insulation.

19. The method of claim 18, the method comprising removing heat traced fittings at the first and second ends of the heat traced tubing and installing the first and second connectors in replace thereof.

20. The method of claim 18, wherein the method of connecting the at least one of the first and second electrical connectors is a method selected from a group consisting of welding, soldering, apply a strap or a clamp about the inner tube member of the prior heat traced tube.

21. The method of claim 12, further comprising installing and operating at least one line sensing thermostat positioned along the impedance heated tube and in line with the at least one of the input IH feed power line and/or the return power line wherein the line sensing thermostat is configured for at least temporarily disconnecting the follow of electrical power when the thermostat senses a temperature in excess of a predetermined disconnect temperature.

22. The method of claim 12, further comprising installing and operating at least one temperature sensor positioned along the impedance heated tube line for sensing a temperature thereof and coupled to the impedance heater control system for transmitting the sensed temperature thereto, and the impedance heater control system being configured for receiving the transmitted sensed temperature of the sensor and configured for controlling the input IH feed power to the impedance heated tube associated with the sensor.

* * * * *